Feb. 19, 1963    W. C. SWARTOUT    3,078,399
VOLTAGE REGULATING SERVOMECHANISM
Filed Oct. 8, 1958

WITNESSES

INVENTOR
Willson C. Swartout
BY
ATTORNEY 3,078,399
VOLTAGE REGULATING SERVOMECHANISM
Willson C. Swartout, Lockport, N.Y., assignor to Westinghouse Electric Corporation, East Pittsburgh, Pa., a corporation of Pennsylvania
Filed Oct. 8, 1958, Ser. No. 765,971
6 Claims. (Cl. 318—28)

This invention relates to electric systems of control and more particularly to closed loop systems.

One broad object of this invention is the provision of hyperconductive semiconductor diode circuitry that inherently amplifies an error signal so that no servo-amplifier is needed between the error signal and the element controlled.

Another broad object of this invention is the provision of hyperconductive semiconductor diodes in oppositely connected loop circuits supplied with error signals to thus in amplified manner energize one loop or the other depending on the magnitude and polarity of the error signal.

A more specific object of this invention is the provision of servo-mechanisms that directly amplify the error signal to directly control the servo device without the use of servo-amplifiers.

Another specific object of this invention is the provision of regulating circuitry utilizing hyperconductive semiconductor diodes that effect amplification and regulating control without the use of amplifiers.

The objects recited are merely illustrative. Other objects and advantages will become more apparent from a study of the following specification and the accompanying drawing, in which.

Figure 3:
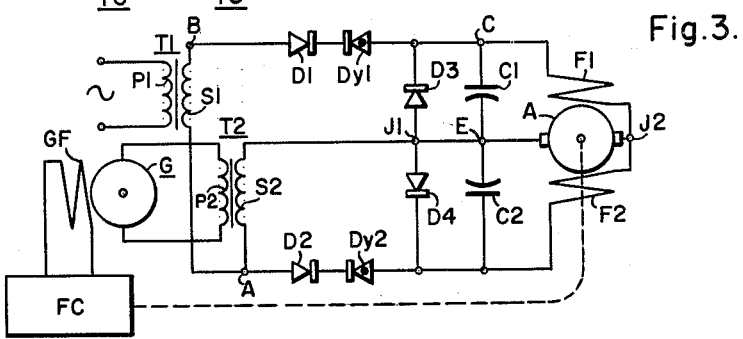
Figure 4:
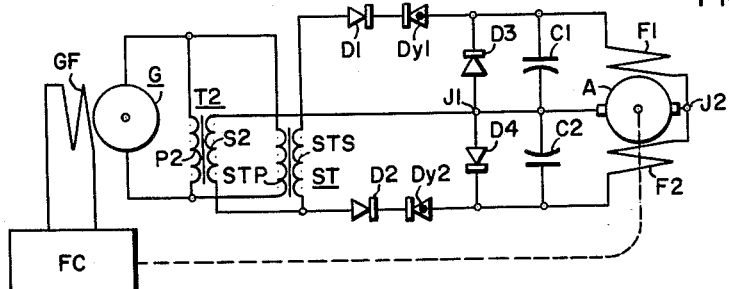

FIG. 3 diagrammatically shows the invention applied to effect voltage regulation; and FIG. 4 shows a modification of FIG. 3.

Figure 1:
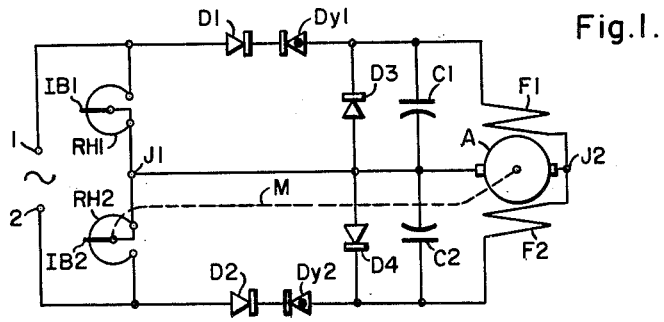
FIGURE 1 is a diagrammatic showing of a follow-up, or servomechanism control.

Referring to FIG. 1, terminals 1 and 2 are in use energized, from a suitable source having a constant voltage and constant frequency alternating current.

A pair of impedances connected in series are connected directly across the terminals 1 and 2. The first impedance which may be designated RH1 is connected between terminal 1 and junction J1 and forms one leg of a voltage divider. The second impedance RH2 is connected between junction 1 and terminal 2 and forms an adjacent leg of the voltage divider.

The other two adjacent legs of the circuit comprise, first, a diode D1, a hyperconductive semiconductor diode, also frequently called a hyperconductive negative resistance semiconductor diode, but also now generally known amongst electrical engineers as a dynistor DY1, a motor field winding F1 to junction J2, and, second, a diode D2, a dynistor DY2, a motor field winding F2 to junction 2. A circuit is established between junctions J1 and J2 which includes the armature of the motor. A capacitor C1 and a diode D3 connected in parallel to capacitor C1 are connected across field winding F1 and the armature of the motor, and similarly, a capacitor C2 and a diode D4 connected in parallel to capacitor C2 are connected across the armature and field winding F2 of the motor. The purpose of the capacitors C1 and C2 and the diodes D3 and D4 is to affect the time it takes the residual voltage of the motor to reach zero volts so that the dynistors will be only sensing the voltage of the voltage divider during the following half cycle. In this way, the dynistors can determine whether one of them should turn back on again.

The hyperconductive negative resistance semiconductor diode, herein also called a dynistor, used in this invention is of the type disclosed in the copending application of John Philips, Serial No. 642,743, entitled "Semiconductor Diode," filed February 27, 1957, and also assigned to the Westinghouse Electric Corporation.

Briefly stated, the characteristics of this hyperconductive negative resistance semiconductor diode is such that when subjected to a rising reverse voltage, namely a voltage in opposition to its rectifying direction, it will manifest a high resistance until the reverse voltage attains a selected magnitude whereupon the resistance substantially instantly vanishes, becomes negative so to speak with respect to the resistance manifested at the lower reverse voltage, and then a relatively large reverse current flows through the diode, that is, the diode breaks down.

The armature of the motor is connected to the rheostat arm IB2 and this rheostat RH2 may be considered as the dependently variable impedance, whereas RH1 through the arm IB1 is the independently variable impedance. Under balanced conditions, when both arms IB1 and IB2 are at corresponding positions on the impedances, the dynistors DY1 and DY2 are not broken down and the motor is not in operation.

Assuming that there is a voltage of 200 volts across terminals 1 and 2 with the distribution being such that the voltage from terminal 1 to junction J1 is 100 volts and from terminal 2 to junction J1, 100 volts, that the breakdown voltage of each of the two dynistors is somewhat greater than 100 volts, and that the breakdown voltage be considered 105 volts. If the means for producing the error signal operating on the arm IB1 (which may be manually or automatically operated from any error signal producing device) causes arm IB1 to move counterclockwise, then the voltage across dynistor DY1 is increased to the breakdown voltage and current flows from terminal 1 through diode D1, dynistor DY1, field winding F1 to junction J2, armature winding A to junction J1, through the dependently variable impedance RH2 to terminal 2. The motor will thus be caused to operate and through the mechanical linkage M between the motor armature and the arm IB2 will move the arm IB2 to such a position to balance the circuit. On the other hand, if IB1 is moved clockwise, a greater than 100 volts appears on dynistors DY2 and that dynistor breaks down and current flows through the field winding F2 and the armature A of the motor, and the motor is caused to operate to move arm IB2 to again balance the circuit. It will thus be apparent that the dynistors are control diodes.

The voltage values given are merely for illustrative purposes since any voltage values may be chosen provided the parameters of the elements of the circuit are chosen to operate at the voltage selected.

From the foregoing, it will be apparent that this invention provides a device which, through the use of two dynistors, is capable directly to operate a follow-up motor without the need of a servo-amplifier. The breakdown of the dynistor makes it possible to make the error signal so powerful that an amplifier is not required. The error signal is thus capable of working a servomotor directly, thus providing a very simple, efficient and inexpensive servomechanism.

Figure 2:
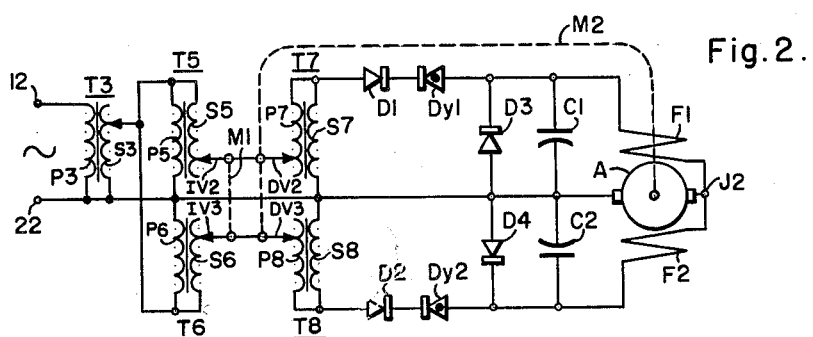
FIG. 2 is a diagrammatic showing of a modified servomechanism.

In FIG. 2, the diodes and dynistor and the motor are interconnected exactly as in FIG. 1. However, the error signal is provided through a pair of transformers to thus effect a push-pull type of signal. In this circuit, terminals 12 and 22 correspond to terminals 1 and 2 of FIG. 1, but terminals 12 and 22 supply the transformer T3 having the primary winding P3 and secondary winding S3. The secondary windings S3 supply the primary windings P5 and P6 of the autotransformers T5 and T6. The secondary windings S5 and S6 of the transformers T5 and T6 are provided with ganged taps IV2 and IV3 comprising the independently variable voltage output that is supplied to the primary windings P7 and P8 of the transformers T7 and T8. The secondary windings of these last two transformers are connected into the circuit exactly like the impedances are connected in FIG. 1, namely, secondary winding S7 holds the same position in the circuit as impedance RH1 and secondary winding S8 holds the same position as the impedance RH2 in FIG. 1.

Again, assuming that the dynistors break down at, say, 105 volts and that the balance output of the secondaries S7 and S8 is 100 volts, it is apparent that when the mechanical connection M1 is moved, let us say in a downward direction, the voltage output of S5 is increased and that of S6 is decreased, and, in consequence, the voltage output of S7 is increased and that of S8 is decreased. Dynistor DY1 will break down and cause the motor armature A to rotate in such a direction as to move the taps DV2 and DV3 together through the coupling M2 to again balance the output of the secondary winding S7. If the taps IV2 and IV3 are moved in an opposite sense, the motor armature will be caused to rotate in a reverse direction to again balance the circuit. Again, a very simple, inexpensive servomechanism is provided to effect a follow-up action of the dependent variable in accordance with the movement of the independent variable.

In FIG. 3, the dynistor and diodes and the motor circuitry are the same as shown in FIGS. 1 and 2 except that transformer T1 through its secondary S1 supplies a constant voltage across junctions A and B, the transformer being supplied from a constant voltage source through primary winding P1.

G represents an alternator, or generator, which is connected to the primary winding P2 of the transformer T2 having the secondary winding S2. This secondary winding S2 is connected across junctions J1 and A, and thus is in a loop circuit including the motor armature, junction J2, the dynister DY2, diode 2 and the secondary winding S2.

The motor armature is mechanically coupled to the field control FC to control the excitation of the generator field winding GF. If, let us say, the generator voltage for some reason drops from the value desired, the output voltage of S2 will be such that DY1 breaks down and causes the motor to operate in such a direction to increase the voltage of the generator G to increase the output of the transformer S2 to thus balance the circuitry and establish the correct voltage for the generator. In this showing, the invention is applied as a regulator providing a simple and effective regulating system for controlling the voltage of an alternator.

When an independent constant voltage constant frequency supply is not available, such voltage may be supplied by the alternator through a constant voltage transformer, namely, a transformer known in the trade as a SOLA transformer. This arrangement is shown in FIG. 4 where the transformer ST represents a constant voltage transformer and the primary winding STP being connected to the alternator and the secondary winding STS being connected to the same points on the circuit, namely, junctions A and B shown in FIG. 3.

Referring again to FIG. 3 and assuming that the voltage output of secondary winding S1 is 200 volts and the output of secondary winding S2 is 100 volts and that they are connected in opposition for balanced voltage conditions, the motor will, of course, not be energized, but if the voltage of the generator becomes 105 volts, then the loop A, J2, E, J1 had 105 volts on it and dynistor DY2 breaks down. Current thus flows through motor field winding F2 and the motor armature winding A, but no current flows through the field winding F1. On the other hand, if the generator voltage drops to, say, 95 volts, then 105 volts are impressed across dynistor DY1 and that dynistor breaks down and the operation is in the reverse direction.

Again it will be noted that this invention provides a simple, inexpensive and very effective regulating system requiring no amplification between the error signal and the device effecting the control, as in the cases illustraing a reversible motor.

While but few modifications have been shown and described, it is apparent that the invention is not limited to the particular showing made but is susceptible of modification and change falling well within the scope of the invention.

I claim as my invention:

1. In a system of control, in combination, a voltage divider circuit, said circuit including a first supply terminal and a second supply terminal, said terminals being energized at a selected voltage, a first series circuit including an independently variable impedance, a junction, and a dependently variable impedance connected across said terminals, said impedances constituting two adjacent legs of the voltage divider circuit, a second series circuit including a forwardly connected first diode, an oppositely connected first control diode comprising a hyperconductive negative resistance semiconductor diode, a translating device, a second junction, a second translating device like the first, a second control diode like the first forwardly connected, and a second diode like the first connected in opposition, connected across said terminals, said first diode, first control diode and first translating device constituting a third leg of the voltage divider circuit and the second translating device, second control diode and second diode constituting the fourth leg of the voltage divider circuit, means for varying the impedance value of the independently variable impedance, whereby a selected variation of the impedance value of the independently variable impedance causes one or the other of said control diodes to break down, depending on the direction of change from a balanced condition of the voltage divider circuit, to energize said means to effect a change in the impedance of the dependently variable impedance to again establish a balanced condition of the voltage divider circuit.

2. In a servomechanism, in combination, a reversible motor having two like but oppositely wound field windings and an armature winding, a first loop circuit including a first supply terminal, a forwardly poled first diode, a reversely poled first control diode of the hyperconductive negative resistance type, one of the motor field windings, a junction, the motor armature winding, a second supply terminal, an independently variable resistor to the first supply terminal, a second loop circuit including a third supply terminal, a forwardly poled second diode, a reversely poled second control diode like the first, the other of the motor field windings, the junction, the motor armature winding, the second supply terminal, a dependently variable resistor to the second supply terminal, said armature winding being mechanically coupled to the dependently variable resistor, whereby, when the first and third supply terminals are energized with alternating current of a selected value and the independently variable resistor is adjusted to unbalance the loop circuits, the control diode subjected to the higher voltage breaks down to so cause energization of the motor to vary the resistance value of the dependently variable resistor to reestablish a balanced condition of the two loop circuits.

3. In a system of control, in combination, three supply terminals, a reversible motor having an armature winding and two oppositely wound field windings, means for varying the voltage supplied to two of said supply terminals, a first loop circuit including one supply terminal, a forwardly poled first diode, a reversely poled control diode of the hyperconductive negative resistance type, one of the motor field windings, a junction, the motor armature winding, a second supply terminal, and means including an independently variable voltage supply and a dependently variable voltage supply interconnected with the three supply terminals, a second loop circuit including the third supply terminal, a forwardly poled second diode, a reversely poled second control diode like the first, the second motor field winding, the motor armature winding, the second supply terminal and said independently variable and dependently variable voltage supplies interconnected with the three supply terminals, said motor armature being mechanically coupled to cause said dependently variable voltage supply to match the independently variable voltage supply to keep the loop circuits balanced.

4. In a system of control, in combination, three supply terminals, a reversible motor having an armature winding and two oppositely wound field windings, an alternator having a field winding, with rheostat control, the excitation of which is to be regulated through its control to thus provide means for varying the voltage supplied to two of said supply terminals, a first loop circuit including one supply terminal, a forwardly poled first diode, a reversely poled first control diode of the hyperconductive negative resistance type, one of the motor field windings, a junction, the motor armature winding, a second supply terminal, and means including an independently variable voltage supply and a dependently variable voltage supply interconnected with the three supply terminals, a second loop circuit including the third supply terminal, a forwardly poled second diode, a reversely poled second control diode like the first, the second motor field winding, the motor armature winding, the second supply terminal and said independently variable and dependently variable voltage supplies interconnected with the three supply terminals, said motor armature being mechanically coupled to the rheostatic control for the alternator field winding to regulate for constant alternator voltage output, said generator output being interconnected with the dependently variable voltage supply.

5. In a system of control, in combination, three supply terminals, a reversible motor having an armature winding and two oppositely wound field windings, an alternator having a field winding, with rheostat control, the excitation of which is to be regulated through its control to thus provide means for varying the voltage supplied to two of said supply terminals, a first loop circuit including one supply terminal, a forwardly poled first diode, a reversely poled first control diode of the hyperconductive negative resistance type, one of the motor field windings, a junction, the motor armature winding, a second supply terminal, and means including an independently variable voltage supply and a dependently variable voltage supply interconnected with the three supply terminals, a second loop circuit including the third supply terminal, a forwardly poled second diode, a reversely poled control diode like the first, the second motor field winding, the motor armature winding, the second supply terminal and said independently variable and dependently variable voltage supplies interconnected with the three supply terminals, said motor armature being mechanically coupled to the rheostatic control for the alternator field winding to regulate for constant alternator voltage output, a constant voltage output transformer having its input connected to the generator output, and its output connected to provide said independently variable voltage output supply, said generator output being interconnected with the dependently variable voltage supply.

6. In a servomechanism, in combination, a motor having an armature winding and two field windings, one loop circuit including hyperconductive negative resistance semiconductor control diodes, one field winding and the motor armature winding, a second similar loop circuit, means for causing a change in voltage in one loop circuit to cause the control diode in that loop circuit to break down, means coupled to the motor to change the voltage distribution in the second loop circuit to establish matching voltage conditions in both loop circuits.

References Cited in the file of this patent

UNITED STATES PATENTS

| | | |
|---|---|---|
| 2,854,651 | Kircher | Sept. 30, 1958 |
| 2,905,877 | Ciscel | Sept. 22, 1959 |
| 2,910,641 | Boyer | Oct. 27, 1959 |
| 2,949,544 | Hill et al. | Aug. 16, 1960 |

FOREIGN PATENTS

| | | |
|---|---|---|
| 551,268 | Canada | Jan. 7, 1958 |